(12) United States Patent
Cheng et al.

(10) Patent No.: US 10,635,142 B2
(45) Date of Patent: Apr. 28, 2020

(54) LAPTOP COMPUTER

(71) Applicant: Acer Incorporated, New Taipei (TW)

(72) Inventors: Yan-Fong Cheng, New Taipei (TW);
Cheng-Nan Ling, New Taipei (TW);
Kai-Teng Cheng, New Taipei (TW);
Cheng-Wen Hsieh, New Taipei (TW);
Fang-Ying Huang, New Taipei (TW);
Szu-Wei Yang, New Taipei (TW);
Yi-Ta Huang, New Taipei (TW);
Pao-Min Huang, New Taipei (TW);
Hsueh-Chih Peng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/385,289

(22) Filed: Apr. 16, 2019

(65) Prior Publication Data

US 2019/0317562 A1 Oct. 17, 2019

(30) Foreign Application Priority Data

Apr. 17, 2018 (TW) .............................. 107113031 A

(51) Int. Cl.
*G06F 1/16* (2006.01)
*E05D 11/00* (2006.01)
*E05D 7/00* (2006.01)

(52) U.S. Cl.
CPC .............. *G06F 1/1683* (2013.01); *E05D 7/00* (2013.01); *E05D 11/0054* (2013.01); *G06F 1/1616* (2013.01); *G06F 1/1637* (2013.01); *E05Y 2900/606* (2013.01)

(58) Field of Classification Search
CPC combination set(s) only.
See application file for complete search history.

(56) References Cited

U.S. PATENT DOCUMENTS

| 7,187,538 | B2 * | 3/2007 | Homer | G06F 1/1616 16/221 |
| 7,207,086 | B2 * | 4/2007 | Yang | G06F 1/1618 16/342 |
| 9,304,549 | B2 * | 4/2016 | Siddiqui | E05D 7/00 |
| 9,395,762 | B2 * | 7/2016 | Sharma | G06F 1/1654 |
| 2001/0009499 | A1 * | 7/2001 | Carlson | G06F 1/1616 361/679.28 |
| 2011/0053651 | A1 * | 3/2011 | Miyashita | G06F 1/1616 455/566 |

(Continued)

FOREIGN PATENT DOCUMENTS

| TW | I259348 B | 8/2006 |
| TW | M542167 U | 5/2017 |

OTHER PUBLICATIONS

Chinese language Office Action dated Dec. 10, 2018, issued in application No. TW 107113031.

*Primary Examiner* — Lisa Lea-Edmonds
(74) *Attorney, Agent, or Firm* — McClure, Qualey & Rodack, LLP

(57) ABSTRACT

A laptop computer includes a host, a hinge mechanism, and a display. The host includes a housing and a base disposed in the housing and having a curved groove. The hinge mechanism is connected to the host and includes a rotation element. The rotation element includes a curved portion located in the curved groove. The display is affixed to the rotation element.

20 Claims, 7 Drawing Sheets

(56) References Cited

U.S. PATENT DOCUMENTS

| | | | |
|---|---|---|---|
| 2014/0285960 A1* | 9/2014 | Sharma | G06F 1/1654 361/679.28 |
| 2016/0091924 A1* | 3/2016 | Aoki | F16M 11/2007 361/679.09 |
| 2018/0364767 A1* | 12/2018 | Onda | G06F 1/1681 |
| 2019/0094918 A1* | 3/2019 | Lin | G06F 1/166 |
| 2019/0171255 A1* | 6/2019 | Cheng | G06F 1/1681 |

\* cited by examiner

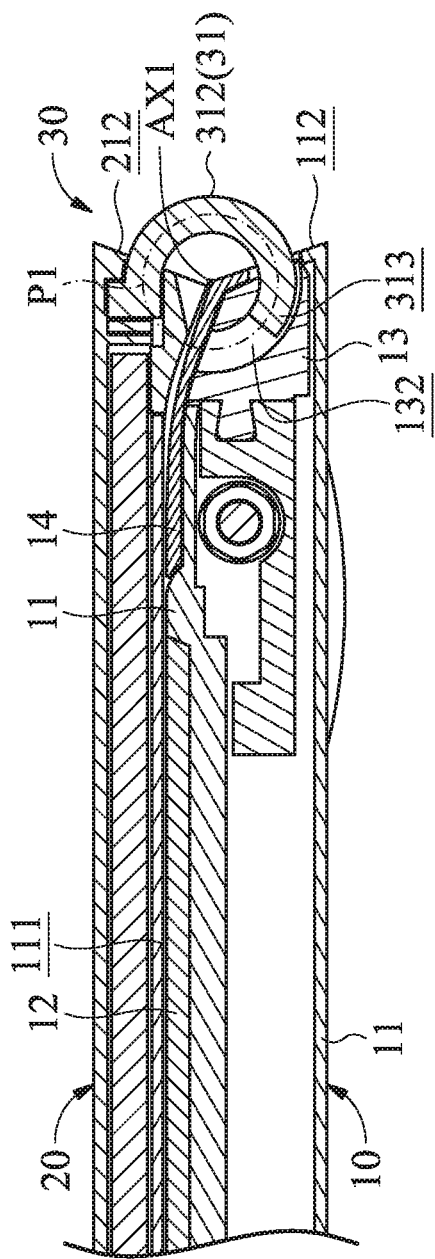
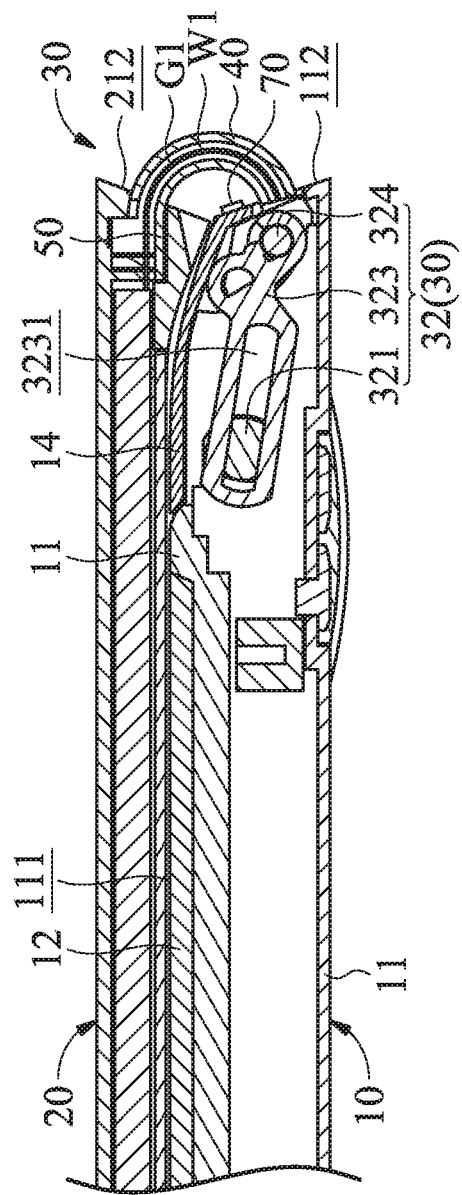
FIG. 6A
FIG. 6B

LAPTOP COMPUTER

CROSS-REFERENCE TO RELATED APPLICATIONS

This application claims priority of Taiwan Patent Application No. 107113031 filed on Apr. 17, 2018, the entirety of which is incorporated by reference herein.

BACKGROUND OF THE INVENTION

Field of the Invention

The present disclosure relates to a laptop computer, and in particular to a laptop computer with a hinge mechanism.

Description of the Related Art

A conventional laptop computer includes a host, a display, and a hinge mechanism. The display can be rotated relative to the host via the hinge mechanism. Moreover, the display can maintain its tilt relative to the host because of the hinge mechanism, providing the user with easy viewing of the display.

However, conventional laptop computers have a noticeable gap at the pivot point between the host and the display, which further affects the appearance of the laptop computer.

Although existing hinge mechanisms for laptop computers have been generally adequate for their intended purposes, they have not been entirely satisfactory in all respects. Consequently, it would be desirable to provide a solution for improving the hinge mechanisms of laptop computers.

BRIEF SUMMARY OF THE INVENTION

The present disclosure provides a laptop computer. The hinge mechanism can be integrated into the display and the host, so that the laptop computer has a better appearance, and this may increase the chance of consumers choosing to purchase the laptop computer of the present disclosure.

The present disclosure provides a laptop computer including a host, a hinge mechanism and a display. The host includes a housing and a base disposed in the housing and having a curved groove. The hinge mechanism is connected to the host, and includes a rotation element. The rotation element includes a curved portion in the curved groove. The display is affixed to the rotation element, and rotatable relative to the host via the hinge mechanism. When the display is rotated relative to the host, the curved portion is rotated relative to the curved groove along a curved path.

In some embodiments, the curved path is a circular path, and the curved groove and the curved portion are C-shaped.

In some embodiments, the hinge mechanism further includes a torque assembly connected to the rotation element, and configured to apply torque between the host and the display; and a fixed element connected to the torque assembly, and affixed to the housing.

In some embodiments, the torque assembly includes a first shaft pivoted on the fixed element; a connection element connected to the first shaft; and a second shaft connected to the connection element and the rotation element, and extending parallel to the first shaft.

In some embodiments, the connection element has a first connection hole, and the first shaft passes through the first connection hole, and is movable in the first connection hole. The longest length of the first connection hole is longer than 1.1 times the longest width of the first shaft, and the longest length and the longest width are measured in the same direction.

In some embodiments, the torque assembly further includes torque elements disposed on the first shaft, and the torque elements apply a first torque between the first shaft and the fixed element.

In some embodiments, the connection element has a second connection hole, and the second shaft passes through the second connection hole. The connection element applies a second torque to the second shaft, and the second shaft is rotatable relative to the connection element.

In some embodiments, the display is rotated relative to the host about a main axis. A fastening element affixes the fixed element to the base along an extension direction that is parallel to the main axis.

In some embodiments, the laptop computer further includes a first curved cover connected to the rotation element; and a transmission wire connected to the host and the display, and adjacent to the first curved cover.

In some embodiments, the laptop computer further includes a second curved cover connected to the rotation element, wherein a gap is formed between the second curved cover and the first curved cover, and the transmission wire is located in the gap. The laptop computer further includes a light source located between the housing and the first curved cover.

In some embodiments, the laptop computer further includes a transparent plate disposed on the housing, and adjacent to the first curved cover. The laptop computer further includes a light source located between the housing and the transparent plate.

In conclusion, the present disclosure integrates the host and the display using a hinge mechanism, so that the display can rotate relative to the host. Moreover, the hinge mechanism of the present disclosure improves the appearance of the laptop computer, and this may increase the chance that consumers will choose to purchase the laptop computer of the present disclosure.

BRIEF DESCRIPTION OF THE DRAWINGS

The invention can be more fully understood by reading the subsequent detailed description and examples with references made to the accompanying drawings, wherein:

FIG. 6A and FIG. 6B are schematic views of the laptop computer in accordance with some embodiments of the disclosure.

DETAILED DESCRIPTION OF THE INVENTION

Figure 1:
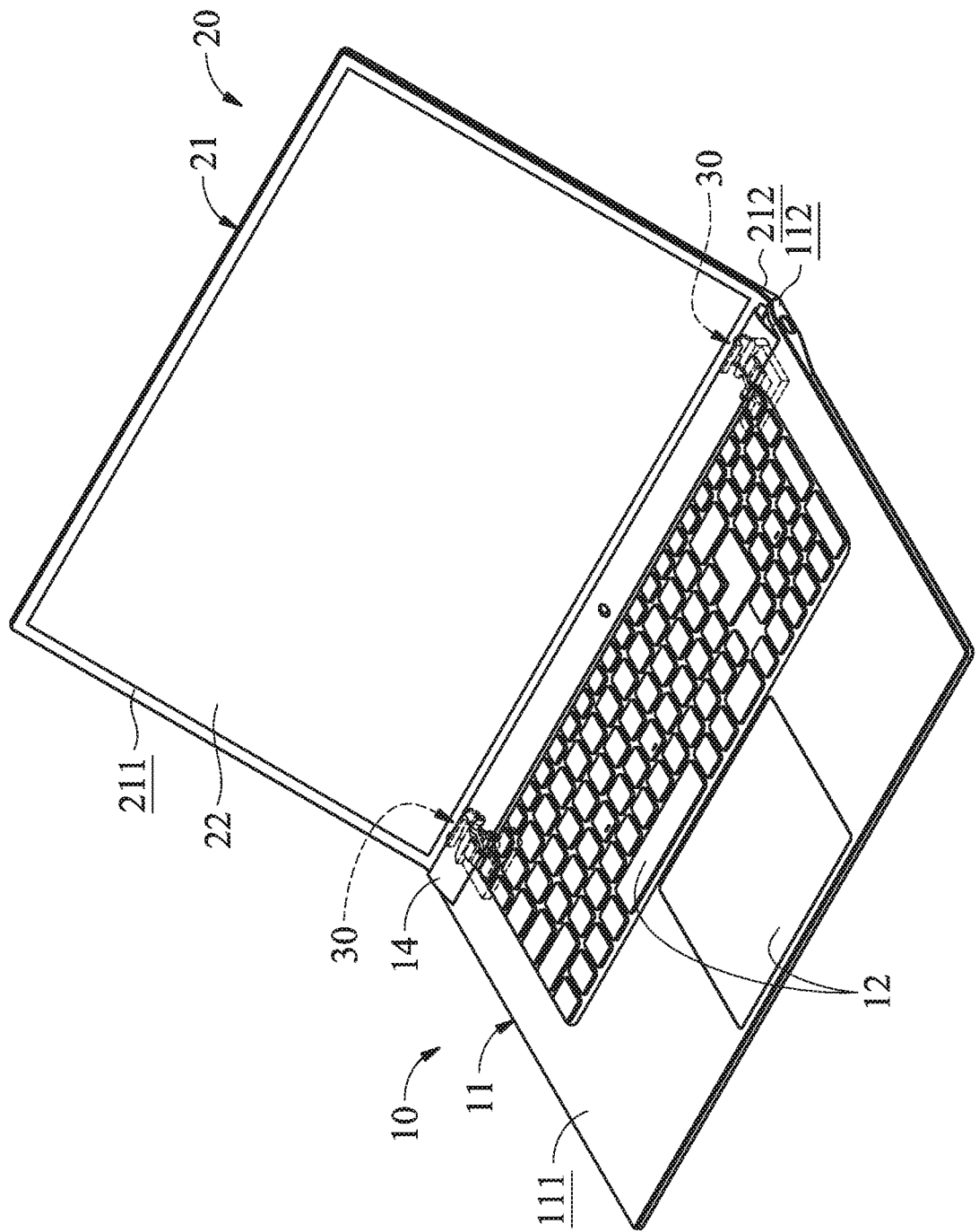
FIG. 1 is a perspective view of a laptop computer in accordance with some embodiments of the disclosure, wherein the laptop computer is in a use position.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to other elements or features as illustrated in the figures. The spatially relative terms are intended to encompass different orientations of the device in a use position or operation in addition to the orientation depicted in the figures. Moreover, the shape, size, and thickness depicted in the drawings may not be drawn to scale or may be simplified for clarity of discussion; these drawings are merely intended for illustration.

Figure 2:
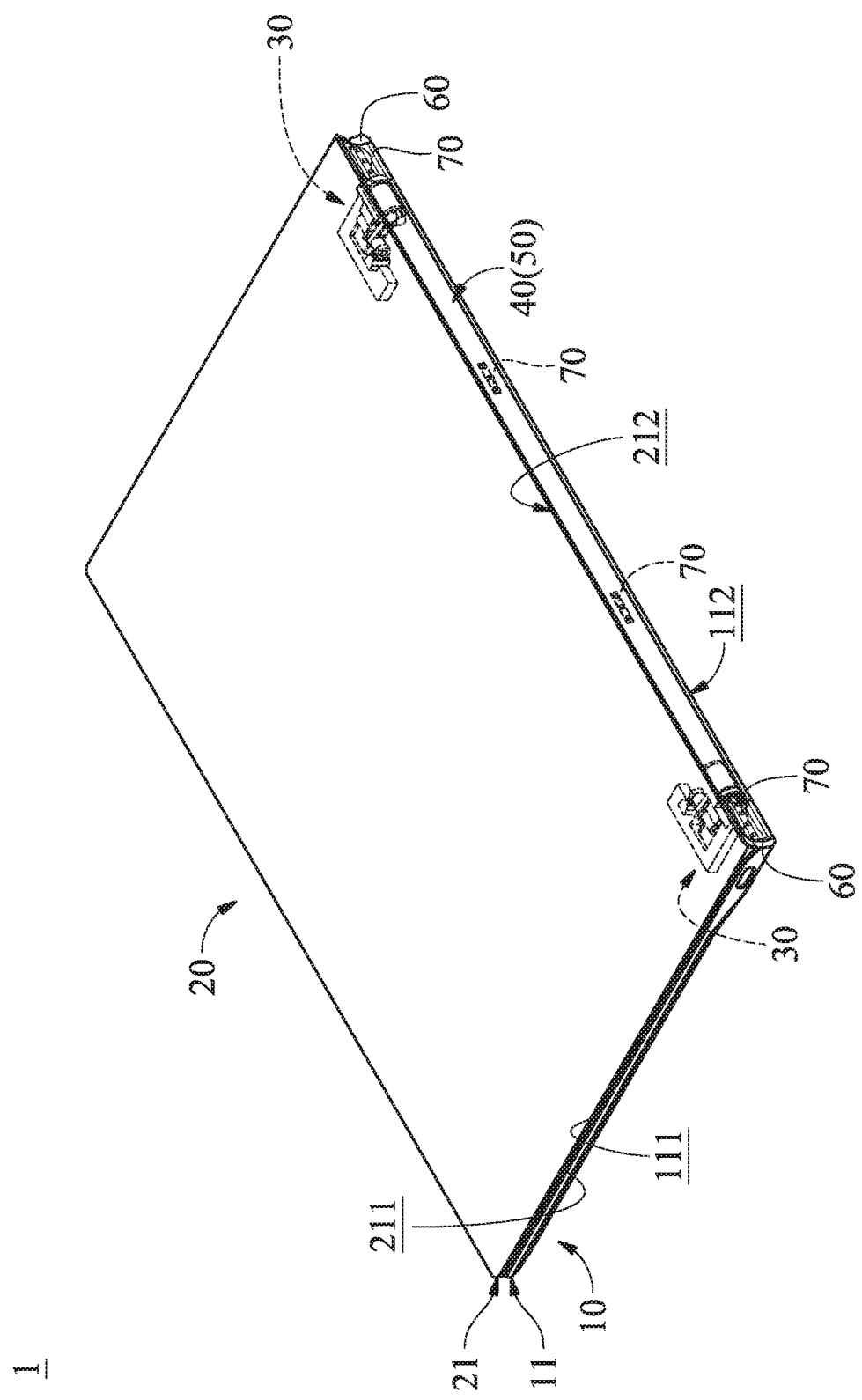
FIG. 2 is a perspective view of a laptop computer in accordance with some embodiments of the disclosure, wherein the laptop computer is in a closed state.

FIG. 1 is a perspective view of a laptop computer 1 in accordance with some embodiments of the disclosure, wherein the laptop computer 1 is in a use position. FIG. 2 is a perspective view of a laptop computer 1 in accordance with some embodiments of the disclosure, wherein the laptop computer 1 is in a closed state. The laptop computer 1 includes a host 10, a display 20, and hinge mechanisms 30. The host 10 may be a plate structure.

The host 10 includes a housing 11 and operation devices 12. The housing 11 may be a plate structure. The operation device 12 is disposed on the operation surface 111 of the housing 11. The operation device 12 is configured to generate operation signals according to user's operation. The operation device 12 may be a keyboard, a touchpad, and/or a touch panel. The host 10 may further include a processor, a motherboard, a memory, and/or a storage device (not shown in figures) disposed in the housing 11.

The display 20 pivots on the host 10 via the hinge mechanism 30. In other words, the display 20 rotates relative to the about host 10 via the hinge mechanism 30. The display 20 may be a plate structure connected to the host 10. In some embodiments, the display 20 is a touch display.

The display 20 includes a display housing 21 and a display panel 22. The display panel 22 is disposed on the display surface 211 of the display housing 21. In some embodiments, the display panel 22 may be a touch display panel. The display panel 22 is configured to display an image. In some embodiments, the host 10 generates display signals according to the operation signals, and transmits the display signals to the display 20. The display 20 displays an image according to the display signals.

As shown in FIG. 1, when the display 20 is in a use position, the display 20 is inclined relative to the host 10. In some embodiments, the angle between the display 20 and the host 10 is greater than 90 degrees and less than 180 degrees. Moreover, the display surface 211 is inclined relative to the operation surface 111.

As shown in FIG. 2, when the display 20 is in a covering position, the display 20 covers the host 10, and the display 20 may be contact with or substantially parallel to the host 10. In some embodiments, the angle between the display 20 and the host 10 is less than 10 degrees. Moreover, the display surface 211 covers the operation surface 111 of the housing 11, and the display surface 211 may be in contact with or substantially parallel to the operation surface 111.

As shown in FIGS. 1 and 2, the hinge mechanism 30 is connected to the host 10 and the display 20. The hinge mechanism 30 is located at the rear side 112 of the housing 11 and the rear side 212 of the display housing 21.

Figure 3:
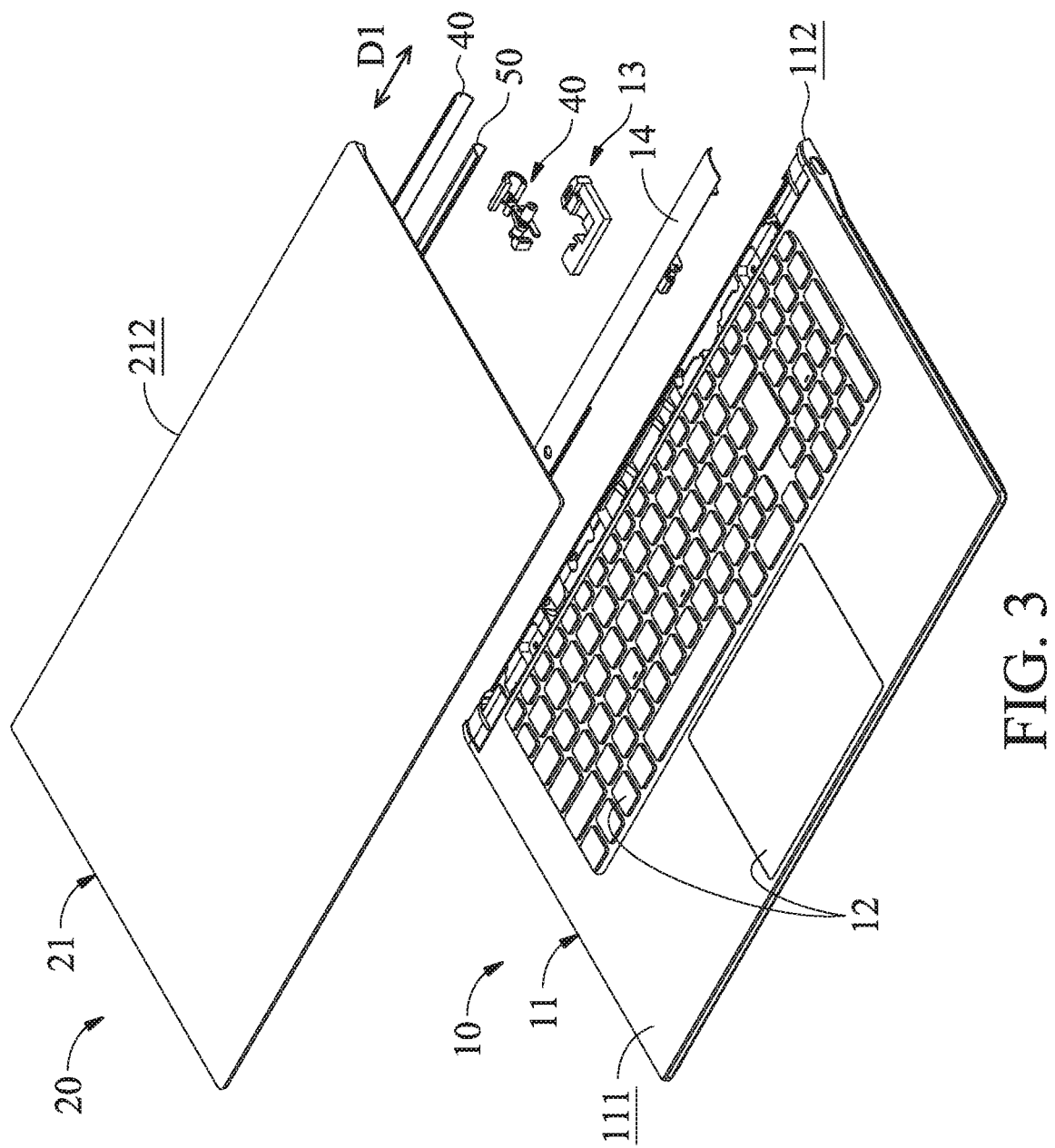
FIG. 3 is an exploded view of the laptop computer in accordance with some embodiments of the disclosure.
Figure 4:
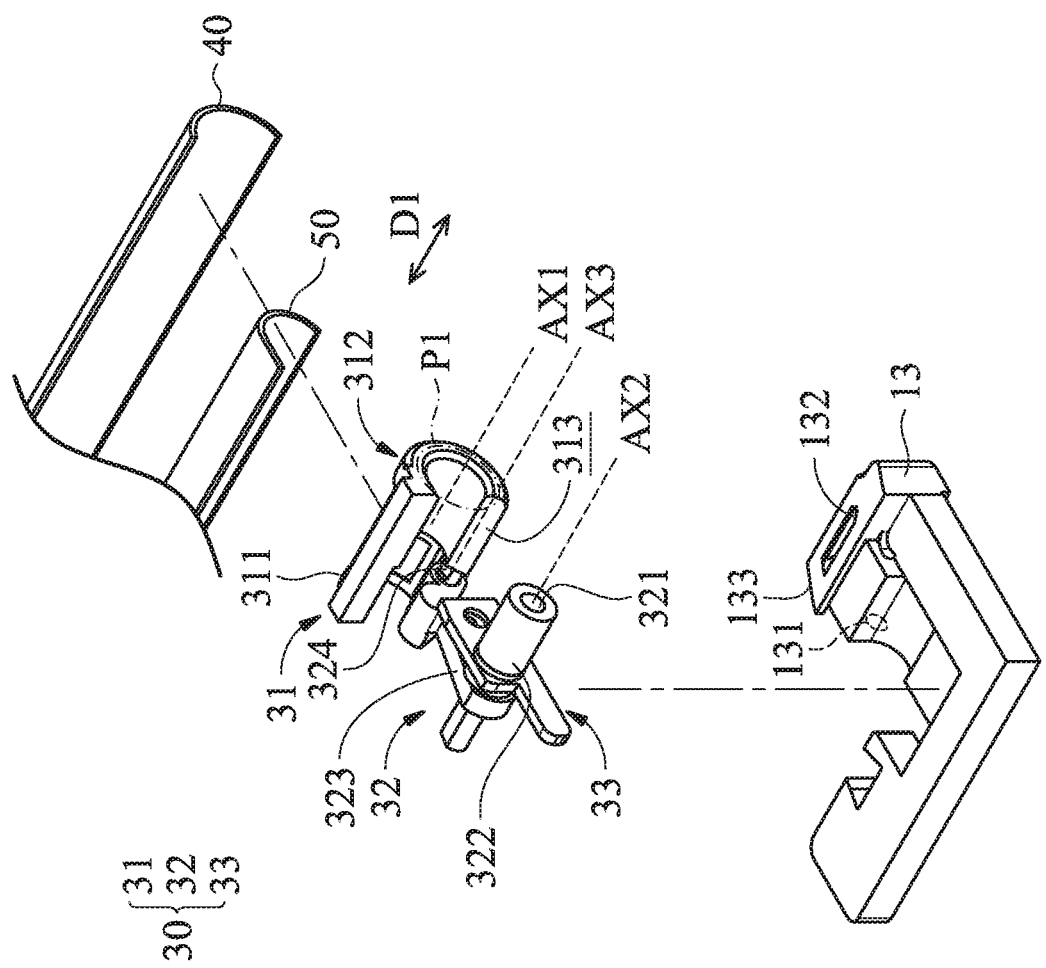
FIG. 4 is a perspective view of the hinge mechanism in accordance with some embodiments of the disclosure.
Figure 5:
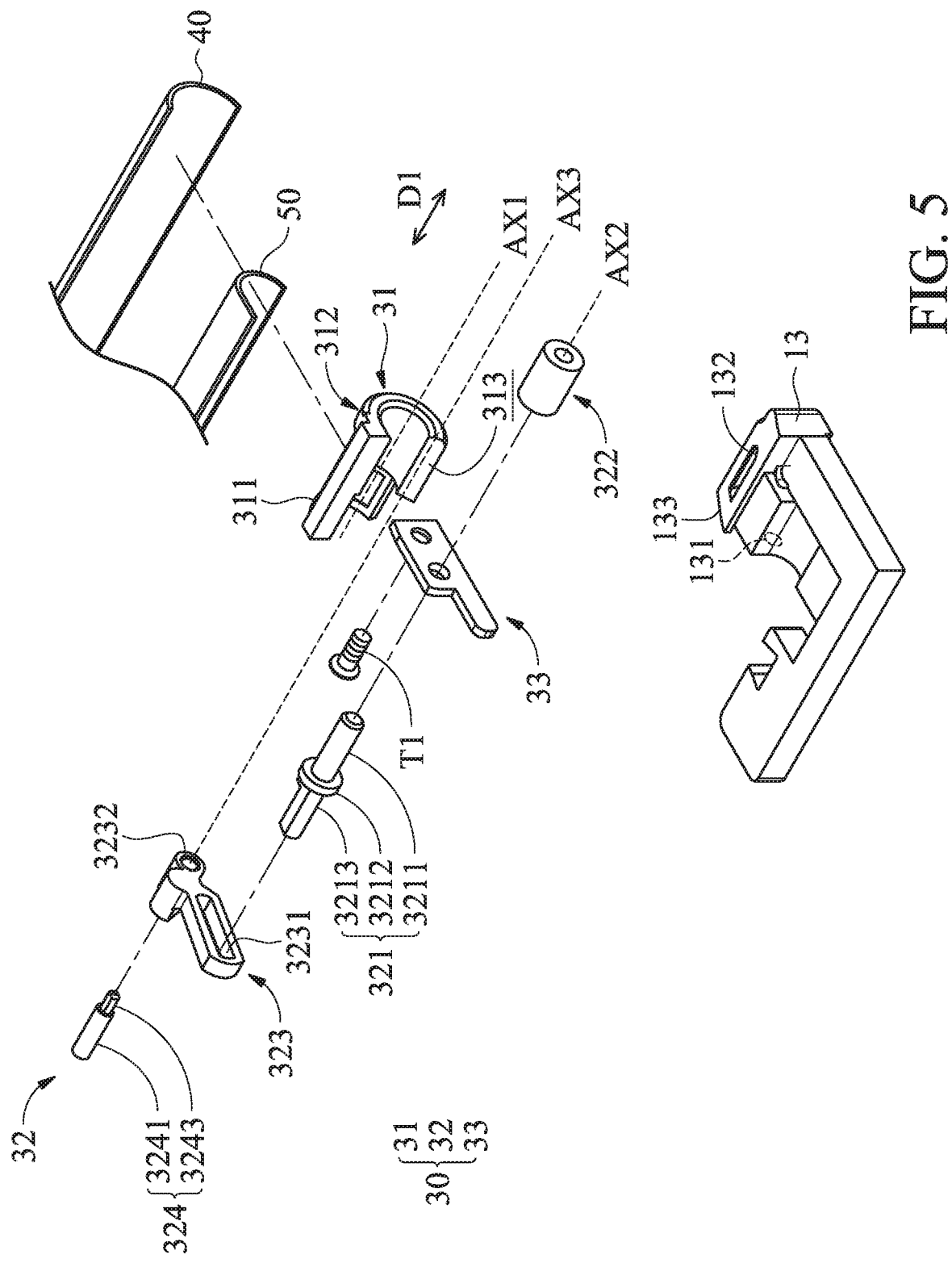
FIG. 5 is an exploded view of the hinge mechanism in accordance with some embodiments of the disclosure.

FIG. 3 is an exploded view of the laptop computer 1 in accordance with some embodiments of the disclosure. FIG. 4 is a perspective view of the hinge mechanism 30 in accordance with some embodiments of the disclosure. FIG. 5 is an exploded view of the hinge mechanism 30 in accordance with some embodiments of the disclosure. FIG. 6A and FIG. 6B are schematic views of the laptop computer 1 in accordance with some embodiments of the disclosure. In FIGS. 3 to 6B, the laptop computer 1 is in a closed state.

The host 10 further includes a base 13 disposed in the housing 11. The base 13 further includes at least one locking hole 131 and a curved groove 132 (such as FIG. 6A). The base 13 may be fastened in the housing 11 via fastening elements (not shown in figures). In some embodiments, the base 13 and the housing 11 are formed as a single piece.

The hinge mechanism 30 includes a rotation element 31, a torque assembly 32, and a fixed element 33. The rotation element 31 may be affixed to the display 20, and rotated relative to the curved groove 132. The rotation element 31 includes a rotation body 311 and a curved portion 312.

The rotation body 311 is affixed to the rear side 212 of the display 20. The curved portion 312 is connected to the rotation body 311. In some embodiments, the rotation body 311 and the curved portion 312 are formed as a single piece. The curved portion 312 is located in the curved groove 132. As shown in FIG. 6A, when the display 20 is rotated relative to the host 10, the curved portion 312 is rotated relative to the curved groove 132 along a curved path P1. In this embodiment, the curved groove 132 and the curved portion 312 are C-shaped.

In some embodiments, the curved path P1 is a circular path. A main axis AX1 passes through the center of the curved path P1. The curved path P1 is located on a plane that is perpendicular to the main axis AX1. In this embodiment, the curved portion 312 is rotated relative to the curved groove 132 about the main axis AX1. In other words, the display 20 is rotated relative to the host 10 about the main axis AX1.

The torque assembly 32 is connected to the rotation element 31 and the fixed element 33. The torque assembly 32 is configured to apply torque between the host 10 and the display 20. The torque assembly 32 includes a first shaft 321, a torque element 322, a connection element 323, and a second shaft 324.

The first shaft 321 is connected to the connection element 323 and the fixed element 33. The first shaft 321 extends along a first axis AX2. The first axis AX2 is parallel to the main axis AX1. In this embodiment, the first shaft 321 pivots on the fixed element 33. The first shaft 321 may be rotated relative to the fixed element 33 about the first axis AX2. Moreover, the first shaft 321 is rotated with the connection element 323.

The first shaft 321 includes a first pivoting portion 3211, a first blocking portion 3212, and a first retaining portion 3213. The first pivoting portion 3211 may be a circular cylinder, passing through the fixed element 33. The first blocking portion 3212 is connected to the first pivoting portion 3211 and the first retaining portion 3213. The first retaining portion 3213 passes through the connection element 323.

The torque element 322 is disposed on the first pivoting portion 3211 of the first shaft 321, and configured to apply a first torque between the first shaft 321 and the fixed element 33. The fixed element 33 is clamped between the torque element 322 and the first blocking portion 3212. The torque element 322 may be ring-like element, and the first pivoting portion 3211 may pass through the center of the torque element 322.

The connection element 323 is disposed on the first retaining portion 3213 of the first shaft 321, and abuts the first blocking portion 3212. The connection element 323 may extend perpendicular to the first axis AX2. In other words, the connection element 323 may be perpendicular to the first shaft 321.

The connection element 323 has a first connection hole 3231 and a second connection hole 3232. The first retaining portion 3213 of the first shaft 321 passes through the first connection hole 3231, and can be moved along the first connection hole 3231. Moreover, the first connection hole 3231 can limit the rotation of the connection element 323 relative to the first retaining portion 3213. In other words, the connection element 323 cannot be rotated relative to the first shaft 321.

In some embodiments, the longest length of the first connection hole 3231 is longer than 1.1 times the longest width of the first shaft 321. The longest length and the longest width are measured in the same direction perpendicular to the first axis AX2.

In some embodiments, the longest width of the first connection hole 3231 is substantially equal to the greatest thickness of the first shaft 321. The longest width and the greatest thickness are measured in the same direction perpendicular to the first axis AX2.

The second shaft 324 is connected to the connection element 323 and the rotation element 31, and extends parallel to the first shaft 321. In this embodiment, the second shaft 324 extends along a second axis AX3. The second axis AX3 is parallel to the first axis AX2 and the main axis AX1.

The second shaft 324 includes a second pivoting portion 3241 and a second retaining portion 3243. The second pivoting portion 3241 pivots on the connection element 323, and passes through the second connection hole 3232. In other words, the second shaft 324 is rotatable relative to the connection element 323. In this embodiment, the connection element 323 applies a second torque to the second shaft 324.

The second retaining portion 3243 is connected to the second pivoting portion 3241 and to the curved portion 312. In this embodiment, the second retaining portion 3243 is affixed to the connection end 313 of the curved portion 312, and the second shaft 324 is rotated and moved with the curved portion 312. In some embodiments, the second shaft 324 cannot be rotated relative to the curved portion 312.

The fixed element 33 is connected to the torque assembly 32, and affixed to the housing 11. In this embodiment, the fixed element 33 is affixed to the base 13. The fixed element 33 includes a first plate 331 and a second plate 332. The first plate 331 extends along a plane that is perpendicular to the first axis AX2. In other words, the first plate 331 is perpendicular to the first shaft 321. The second plate 332 extends perpendicular to first plate 331.

In this embodiment, a fastening element T1 fastens the first plate 331 of the fixed element 33 to a side surface 133 of the base 13 along an extension direction D1 parallel to the main axis AX1. The side surface 133 is perpendicular to the extension direction D1.

As shown in FIGS. 6A and 6B, the laptop computer 1 is in a closed state, and the display 20 covers the host 10. Moreover, the connection end 313 of the curved portion 312 of the rotation element 31 is located in the curved groove 132 of the base 13. The protection cover 14 of the housing 11 is located on the operation surface 111 of the housing 11. The protection cover 14 pivots on the housing 11.

Figure 7:
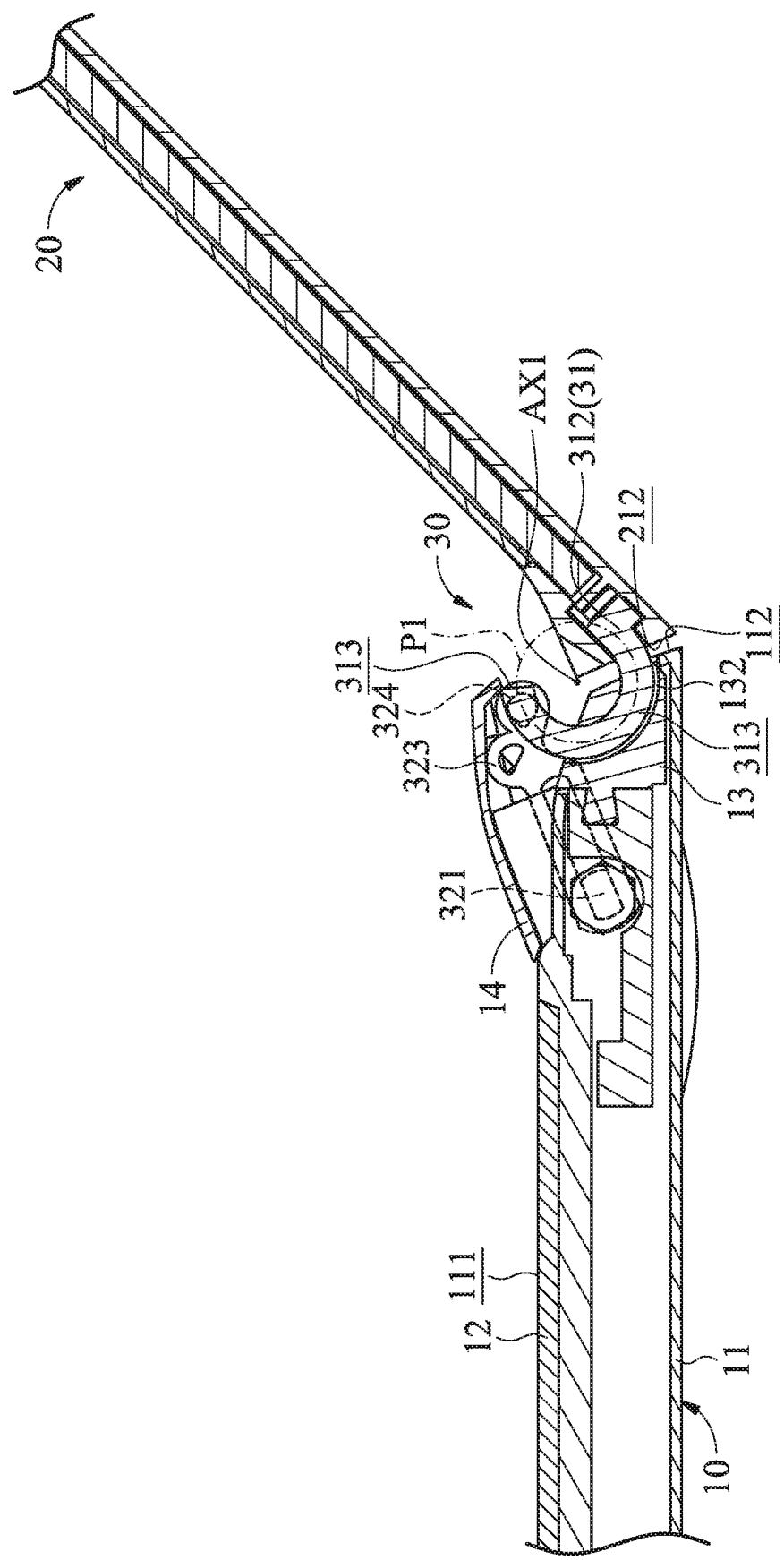
FIG. 7 is a schematic view of the laptop computer in accordance with some embodiments of the disclosure, wherein the laptop computer is in a use position.

FIG. 7 is a schematic view of the laptop computer 1 in accordance with some embodiments of the disclosure, wherein the laptop computer 1 is in a use position. The display 20 is rotated relative to the host 10, so as to make the display 20 to be inclined relative to the host 10. Moreover, the connection end 313 leaves the curved groove 132, and is exposed from the base 13. The connection end 313 is moved with the second shaft 324. In addition, the second shaft 324 is rotated with the connection element 323 about the first shaft 321.

When the laptop computer 1 is in a use position, the connection end 313 and the connection element 323 are protruded from the operation surface 111 of the housing 11. The connection element 323 pushes the protection cover 14 to be inclined relative to the operation surface 111. In some embodiments, an electric element (such as a microphone, an antenna, and a camera) is disposed on the protection cover 14.

Therefore, with the disclosed hinge mechanism 30, the display 20 can be rotated relative to the host 10 via the hinge mechanism 30, and the appearance of the rear side of the laptop computer 1 can be improved.

As shown in FIG. 2 to FIG. 4, in this embodiment, the laptop computer 1 further includes a first curved cover 40, a second curved cover 50, two transparent plates 60, and at least one light source 70. The first curved cover 40, the second curved cover 50, and the transparent plate 60 covers the rear side 112 of the host 10 and the rear side 212 of the display 20. The first curved cover 40 and the second curved cover 50 are located between the transparent plates 60.

As shown in FIG. 4 and FIG. 6B, the first curved cover 40 and the second curved cover 50 are connected to or affixed to the rotation body 311 of the rotation element 31. The first curved cover 40 and the second curved cover 50 extend along the extension direction D1. A cross section of the first curved cover 40 and the second curved cover 50, which is perpendicular to the extension direction D1, is curved. The first curved cover 40 is separated from and parallel to the second curved cover 50. A gap G1 is formed between the first curved cover 40 and the second curved cover 50.

As shown in FIG. 6B, the laptop computer 1 further includes a transmission wire W1 connected to the host 10 and the display 20, and adjacent to the first curved cover 40 and the second curved cover 50. The transmission wire W1 is located in the gap G1.

The shapes of the first curved cover 40 and the second curved cover 50 correspond to the shape of the rotation element 31. Therefore, with the first curved cover 40 and/or the second curved cover 50, the appearance of the rear side of the laptop computer 1 can be improved, and thus transmission wire W1 can be configured finely in the laptop computer 1.

As shown in FIGS. 2 and 6B, the light source 70 is disposed on the housing 11 and adjacent to the first curved cover 40, the second curved cover 50, and/or the transparent plate 60. The light source 70 is configured to generate light passing through the transparent plate 60. When the first curved cover 40 and the second curved cover 50 are transparent, the light can pass through the first curved cover 40 and the second curved cover 50.

In one embodiment, when the laptop computer 1 is low on battery power, the light source 70 generates light of a first color (such as red). The light of the first color passes through the first curved cover 40, the second curved cover 50, and/or the transparent plate 60 to remind the user that the laptop computer 1 has insufficient power, and it should be charged.

In one embodiment, when the laptop computer 1 is charging, the light source 70 generates light of a second color (such as orange). The light of the second color passes through the first curved cover 40, the second curved cover 50, and/or the transparent plate 60 to remind the user that the laptop computer 1 is charging.

In one embodiment, When the power of the laptop computer 1 is sufficient (for example, the battery power of the laptop computer 1 exceeds 80%), the light source 70 generates light of a third color (such as green). The light of the third color passes through the first curved cover 40, the second curved cover 50, and/or the transparent plate 60 to remind the user that the power of the laptop computer 1 is sufficient.

In conclusion, the present disclosure integrates the host and the display using a hinge mechanism, so that the display can rotate relative to the host. Moreover, the hinge mechanism of the present disclosure improves the overall appearance of the laptop computer, and this may increase the likelihood that consumers will choose to purchase the laptop computer of the present disclosure.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A laptop computer, comprising:
a host, comprising:
a housing; and
a base disposed in the housing, and having a curved groove;
a hinge mechanism connected to the host, and comprising:
a rotation element comprising a curved portion located in the curved groove;
a torque assembly connected to the rotation element, and configured to apply torque between the host and the display; and
a fixed element connected to the torque assembly, and affixed to the housing; and
a display affixed to the rotation element, and being rotatable relative to the host via the hinge mechanism,
wherein when the display is rotated relative to the host, the curved portion is rotated relative to the curved groove along a curved path.

2. The laptop computer as claimed in claim 1, wherein the curved path is a circular path, and the curved groove and the curved portion are C-shaped.

3. The laptop computer as claimed in claim 1, wherein the torque assembly comprises:
a first shaft pivoted on the fixed element;
a connection element connected to the first shaft; and
a second shaft connected to the connection element and the rotation element, and extending parallel to the first shaft.

4. The laptop computer as claimed in claim 3, wherein the connection element has a first connection hole, and the first shaft passes through the first connection hole, and is movable in the first connection hole,
wherein a longest length of the first connection hole is longer than 1.1 times a longest width of the first shaft, and the longest length and the longest width are measured in the same direction.

5. The laptop computer as claimed in claim 3, wherein the torque assembly further comprises a plurality of torque elements disposed on the first shaft, and the torque elements apply a first torque between the first shaft and the fixed element.

6. The laptop computer as claimed in claim 3, wherein the connection element has a second connection hole, and the second shaft passes through the second connection hole, wherein the connection element applies a second torque to the second shaft, and the second shaft is rotatable relative to the connection element.

7. The laptop computer as claimed in claim 1, wherein the display is rotated relative to the host about a main axis, wherein a fastening element affixes the fixed element to the base along an extension direction that is parallel to the main axis.

8. The laptop computer as claimed in claim 1, further comprising:
a first curved cover connected to the rotation element; and
a transmission wire connected to the host and the display, and adjacent to the first curved cover.

9. The laptop computer as claimed in claim 8, further comprising a second curved cover connected to the rotation element, wherein a gap is formed between the second curved cover and the first curved cover, and the transmission wire is located in the gap.

10. The laptop computer as claimed in claim 8, further comprising a light source located between the housing and the first curved cover.

11. The laptop computer as claimed in claim 8, further comprising a transparent plate disposed on the housing, and adjacent to the first curved cover.

12. The laptop computer as claimed in claim 11, further comprising a light source located between the housing and the transparent plate.

13. A laptop computer, comprising:
a host, comprising:
a housing; and
a base disposed in the housing, and having a curved groove;
a hinge mechanism connected to the host, and comprising:
a rotation element comprising a curved portion located in the curved groove;
a first curved cover connected to the rotation element;
a transmission wire connected to the host and the display, and adjacent to the first curved cover; and
a display affixed to the rotation element, and being rotatable relative to the host via the hinge mechanism,
wherein when the display is rotated relative to the host, the curved portion is rotated relative to the curved groove along a curved path.

14. The laptop computer as claimed in claim 13, further comprising a second curved cover connected to the rotation element, wherein a gap is formed between the second curved cover and the first curved cover, and the transmission wire is located in the gap.

15. The laptop computer as claimed in claim 13, further comprising a light source located between the housing and the first curved cover.

16. The laptop computer as claimed in claim 13, further comprising a transparent plate disposed on the housing, and adjacent to the first curved cover.

17. The laptop computer as claimed in claim 16, further comprising a light source located between the housing and the transparent plate.

18. The laptop computer as claimed in claim 13, wherein the curved path is a circular path, and the curved groove and the curved portion are C-shaped.

19. The laptop computer as claimed in claim 13, wherein the hinge mechanism further comprises:
- a torque assembly connected to the rotation element, and configured to apply torque between the host and the display; and
- a fixed element connected to the torque assembly, and affixed to the housing, wherein the torque assembly comprises:
- a first shaft pivoted on the fixed element;
- a connection element connected to the first shaft; and
- a second shaft connected to the connection element and the rotation element, and extending parallel to the first shaft.

20. The laptop computer as claimed in claim 19, wherein the connection element has a first connection hole, and the first shaft passes through the first connection hole, and is movable in the first connection hole,
- wherein a longest length of the first connection hole is longer than 1.1 times a longest width of the first shaft, and the longest length and the longest width are measured in the same direction.

* * * * *